(12) United States Patent
Stepper et al.

(10) Patent No.: US 10,336,052 B2
(45) Date of Patent: Jul. 2, 2019

(54) PHOTOCURABLE RESIN COMPOSITION FOR FORMING SUPPORT REGIONS

(71) Applicant: I-SQUARED GmbH, Baar (CH)

(72) Inventors: Jan-Michael Stepper, Bottighofen (CH); Tsuneo Hagiwara, Tokyo (JP)

(73) Assignee: ISQUARED GmbH, Lengwil-Oberhofen (CH)

( * ) Notice: Subject to any disclaimer, the term of this patent is extended or adjusted under 35 U.S.C. 154(b) by 178 days.

(21) Appl. No.: 15/125,589

(22) PCT Filed: Mar. 25, 2015

(86) PCT No.: PCT/EP2015/056403
§ 371 (c)(1),
(2) Date: Sep. 13, 2016

(87) PCT Pub. No.: WO2015/144761
PCT Pub. Date: Oct. 1, 2015

(65) Prior Publication Data
US 2017/0001382 A1 Jan. 5, 2017

(30) Foreign Application Priority Data
Mar. 25, 2014 (JP) .................................. 2014-061175

(51) Int. Cl.
*B33Y 40/00* (2015.01)
*C08F 220/58* (2006.01)
(Continued)

(52) U.S. Cl.
CPC ............ *B33Y 40/00* (2014.12); *B29C 64/112* (2017.08); *B29C 64/40* (2017.08); *B33Y 10/00* (2014.12);
(Continued)

(58) Field of Classification Search
CPC ............................... B29C 64/40; B33Y 40/00
See application file for complete search history.

(56) References Cited

U.S. PATENT DOCUMENTS

| 6,259,962 B1 | 7/2001 | Gothait |
| 2013/0234370 A1* | 9/2013 | Suzuki ................. C08F 220/10 |
| | | 264/401 |

FOREIGN PATENT DOCUMENTS

| EP | 2 636 511 A1 | 9/2013 |
| JP | 2003-535712 A | 12/2003 |

(Continued)

OTHER PUBLICATIONS

English Translation of JPWO2015186521A1. Published Apr. 20, 2017. Priority to Jun. 2, 2014 (Year: 2017).*
(Continued)

*Primary Examiner* — Matthew J Daniels
*Assistant Examiner* — Hana C Page
(74) *Attorney, Agent, or Firm* — Davis & Bujold PLLC; Michael J. Bujold (57) ABSTRACT

A photocurable resin composition for support regions for use in photochemical fabrication by an inkjet method, which has low viscosity and outstanding photocurability, and where the support regions, formed by the photocuring, have good supporting performance and, following the end of the photochemical fabrication, can readily be removed from the main body by dissolving in water and/or by a weak external force such as a water jet. The photocurable resin composition for support regions for use in photochemical 3D fabrication by the inkjet method contains, based on the total mass of photocurable resin composition, from 2 to 20 mass % of N-hydroxyalkyl (meth) acrylamide, from 2 to 20 mass % of (meth) acryloyl morpholine, from 3 to 30 mass % of (meth) acrylate compound having at least one (meth) acryloyloxy group, from 40 to 90 mass % of polyhydroxy compound
(Continued)

containing two or more hydroxyl groups, and from 0.1 to 5 mass % of a photo-radical polymerization initiator.

5 Claims, 1 Drawing Sheet (51) Int. Cl.
- $C08L\ 33/14$ (2006.01)
- $C08F\ 2/48$ (2006.01)
- $B33Y\ 70/00$ (2015.01)
- $B33Y\ 10/00$ (2015.01)
- $B29C\ 64/112$ (2017.01)
- $B29C\ 64/40$ (2017.01)
- $C08F\ 220/28$ (2006.01)
- $C08F\ 220/36$ (2006.01)
- $B29C\ 64/124$ (2017.01)

(52) U.S. Cl.
CPC ............ *B33Y 70/00* (2014.12); *C08F 2/48* (2013.01); *C08F 220/28* (2013.01); *C08F 220/36* (2013.01); *C08F 220/58* (2013.01); *C08L 33/14* (2013.01); *B29C 64/124* (2017.08); *C08F 2500/17* (2013.01); *C08F 2800/20* (2013.01); *C08L 2312/06* (2013.01)

(56) References Cited

FOREIGN PATENT DOCUMENTS

| | | |
|---|---|---|
| JP | 2010-155889 A | 7/2010 |
| JP | 2012-111226 A | 6/2012 |
| JP | 2013-209487 A | 10/2013 |

OTHER PUBLICATIONS

International Search Report Corresponding to PCT/EP2015/056403 dated Jun. 15, 2015.
Written Opinion Corresponding to PCT/EP2015/056403 dated Jun. 15, 2015.

* cited by examiner

PHOTOCURABLE RESIN COMPOSITION FOR FORMING SUPPORT REGIONS

TECHNICAL FIELD

The present invention relates to a photocurable resin composition for use in forming support regions at the time of the production of photochemically fabricated 3D objects based on the inkjet method using a photocurable resin composition, and to a method for the production of photochemically fabricated 3D objects using this photocurable resin composition for forming support regions.

TECHNICAL BACKGROUND

Photochemical 3D fabrication methods produce fabricated 3D articles by performing photochemical fabrication using a photocurable resin composition. The methods are based on data input in three-dimensional CAD and are widely employed due to the fact that the target 3D fabricated object can be manufactured at high dimensional accuracy without creating a mould or the like.

As the photochemical 3D fabrication method, it has been widely adopted to selectively irradiate a liquid surface of a liquid-form photocurable resin composition which is introduced into a container (the fabrication tank for holding the photocurable resin composition) with light. Irradiation is controlled by a computer in a specified drawn pattern and curing is effected to a specified thickness resulting in a first layer. On the top of a first layer a second cured layer is created. The second layer comprises the same liquid resin layer as the first layer and is cured to a specified thickness by selective irradiation with light in the same way as the first layer. This layering process of forming cured layers produces a fabricated 3D object.

However, while the above conventional photochemical fabrication method has the advantage of producing fabricated 3D objects of outstanding accuracy regarding form and dimension, it has the disadvantage that a storage container (the fabrication tank) for holding a large amount of photocurable resin composition is necessary. The scale of the equipment is increased and in addition the amount of employed photocurable resin composition is raised. Further, it is difficult to produce multi-coloured fabricated 3D objects or fabricated 3D objects with different properties such as different hardness in different parts.

To overcome these drawbacks a photochemical 3D fabrication method based on the inkjet system has been developed (see JP-T-2003-535712). Such a method requires only small scale equipment and enables multi-coloured fabricated 3D objects or fabricated 3D objects having different hardness, or other properties, in different parts. Further only low quantities of photocurable resin are needed during the production.

In photochemical 3D fabrication using the inkjet method, fine droplets of a liquid-form photocurable resin composition are discharged from nozzles onto a base plate in a specified drawn pattern based on data input in 3D CAD, followed by light irradiation to effect curing. Then, further fine droplets of the liquid-form photocurable resin composition are discharged thereon from the nozzles in a specified drawn pattern, producing a superimposed layer, followed again by light irradiation. The repetition of this operation finally leads to a fabricated 3D object.

In both cases, the aforedescribed conventional photochemical 3D fabrication method in which the surface of the liquid-form photocurable composition held in the fabrication tank is irradiated with light of specified pattern to produce a fabricated 3D object and the photochemical 3D fabrication method employing the inkjet method, the fabricated 3D object may show distortion due to, for example, the self-weight of the 3D body during fabrication or following fabrication (for example, a fabricated 3D object having an overhang region, etc.). Further, distortion or the like readily occurs due to the influence of the heat associated with the light irradiation. Hence, support regions connected to the main body (the final fabricated 3D object) are also formed along with the main body at the time of the photochemical fabrication process in order to prevent such distortion to the main body.

In the aforesaid conventional photochemical 3D fabrication method in which the surface of the liquid-form photocurable composition held in the fabrication tank is irradiated with light of specified pattern to produce a fabricated 3D object, the photochemical fabrication is carried out using a single type of photocurable resin composition held in the fabrication tank. The support regions are formed from the same material as the main body and at the end of the photochemical fabrication process is removed from the main body by a mechanical means such as cutting, machining or abrading.

Using the inkjet method, the support regions may also be removed from the fabricated 3D object obtained by photochemical fabrication using a mechanical means such as cutting or machining (see JP-T-2003-535712). However the inkjet method provides the possibility to carry out photochemical fabrication by discharging fine liquid droplets of different photocurable resin compositions having different properties from the nozzles. There have been proposed techniques in which the main body is formed using a photocurable resin composition which produces a water-insoluble cured product and where the support regions are formed using a photocurable resin composition which produces a water-soluble cured product (see JP-A-10-155889 and JP-A-2012-111226).

The technique described in JP-A-10-155889 relates to a photocurable resin composition for forming the support regions employed in a photochemical fabrication method based on the inkjet method. The photocurable resin composition contains (A) 15-99 mass % of an acrylamide-based compound having one vinyl group, (B) 0.1-5 mass % of chain transfer agent and (C) 0.5-10 mass % of photopolymerization initiator, optionally along with (D) (meth)acrylate compound having at least two (meth)acryloyl groups and an aliphatic polyether structure or an aliphatic polyester structure, and/or (E) a non-curable compound of theoretical molecular weight no more than 500 having two or more hydroxyl groups. This photocurable resin composition chiefly comprises a (meth)acrylamide compound having one (meth)acryloyl group. By adding the chain transfer agent, the molecular weight is controlled and water solubility secured. The required mechanical properties as a support region are obtained by optionally using component (D) [(meth)acrylate compound of functionality two or more] in this photocurable resin composition. However, the water solubility of the support regions following photocuring is insufficient and the photochemically fabricated object needs to be immersed in water for a long time in order to eliminate the support regions from the main body.

The technique described in JP-A-2012-111226 relates to a photocurable resin composition for forming the support regions employed in an inkjet photochemical fabricating method. The resin composition contains water-soluble monofunctional ethylenically-unsaturated monomer, alkylene oxide adduct containing oxypropylene groups, and/or water, together with a photopolymerization initiator. This photocurable resin composition forms support regions which readily dissolve in water. However, the photocuring performance is inadequate, and the supporting performance of the support regions formed by the photocuring is also unsatisfactory.

OUTLINE OF THE INVENTION

It is an object of the present invention to provide a photocurable resin composition which is employed as the support region forming material during the production of fabricated 3D objects using a photochemical fabrication technique based on the inkjet method.

It is another object of the present invention to provide a photocurable resin composition for forming the support regions used at the time of the production of a photochemically fabricated 3D object by means of the inkjet method in which the viscosity of the resin composition is low and discharge is possible from the nozzles in fine liquid droplet form without producing nozzle clogging and in which the resin composition forms a cured material having sufficient supporting performance.

A further object of the present invention is to provide a photocurable resin composition for forming the support regions used at the time of the production of a photochemically fabricated 3D object by the inkjet method which forms a photocured product with high water solubility A further object of the present invention is to provide a photocurable resin composition for forming the support regions used at the time of the production of a photochemically fabricated 3D object by the inkjet method which forms support regions which can be readily removed from the photochemically fabricated 3D object produced by photochemical fabrication by the inkjet method, by applying a weak external force (for example, a water jet).

Moreover, it is an object of the present invention to provide a method for the production of fabricated 3D objects by photochemical fabrication using the inkjet method and a photocurable resin composition for forming the support regions.

The above mentioned objects are solved by a photocurable resin composition according to the characterizing portions of the independent claim as well as a method for fabricating a 3D object.

A photocurable resin composition according to the present invention and for use in forming the support regions at the time of the production of a photochemically fabricated 3D object by means of the inkjet method comprises, in proportions based on the total mass of said photocurable resin composition for forming the support regions:

(A) from 2 to 20 mass % of an N-hydroxyalkyl (meth)acrylamide (I) represented by the following general formula (I):

$R^1$ represents a hydrogen atom or a methyl group and $R^2$ represents a $C_{2-4}$ straight-chain or branched alkylene group;

(B) from 2 to 20 mass % of (meth)acryloyl morpholine (II) represented by the following general formula (II):

$R^3$ represents a hydrogen atom or a methyl group;

(C) from 3 to 30 mass % of (meth)acrylate compound containing at least one (meth)acryloyloxy group;

(D) from 40 to 90 mass % of a polyhydroxy compound having two or more hydroxyl groups; and (E) from 0.1 to 5 mass % of a photo-radical polymerization initiator.

It was discovered that a photocurable resin composition containing N-hydroxyalkyl (meth)acrylamide, (meth)acryloyl morpholine, (meth)acrylate compound having at least one (meth)acryloyloxy group, polyhydroxy compound having two or more hydroxyl groups, and photo-radical polymerization initiator, in specified proportions, has low viscosity and can be discharged from nozzles in the form of fine liquid droplets without producing nozzle clogging. Further, it provides excellent photocuring properties. The support regions formed by this photocurable resin composition have sufficient support performance while still being readily water soluble and can be rapidly removed from the main body. A cured material can also be formed which is readily separated away from the main body with a weak external force such as a water jet. Hence, this composition is extremely suitable as a photocurable resin composition for forming the support regions in the production of photochemically fabricated 3D objects by means of the inkjet method using a photocurable resin composition.

Furthermore, by carrying out photochemical 3D fabrication using the inkjet method and this photocurable resin composition for forming the support regions along with the photocurable resin composition which is employed to form the main body, a simple and smooth way is provided to obtain a fabricated 3D object of excellent appearance and dimensional accuracy without distortion or strain upon removing the support regions in the fabricated 3D object by dissolving in water and/or by spraying a water jet thereat.

Preferably, the combined content of the N-hydroxyalkyl (meth)acrylamide (I) and (meth)acryloyl morpholine (II) of the photocurable resin composition for forming support regions is from 5 to 40 mass %, based on the total mass of the photocurable resin composition for forming the support regions.

In a preferred composition of the photocurable resin composition for forming support regions, component (C) is a (meth)acrylate compound having a (meth)acryloyloxy group and an aliphatic polyether structure;

Alternativly the photocurable resin composition for forming support regions comprises a non-curable polyhydroxy compound of molecular weight no more than 2000 as component (D).

Preferably, the photocurable resin composition for forming support regions contains, as part of component (D), from 2 to 10 mass % of diglycerol, as a proportion based on the total mass of the photocurable resin composition for forming the support regions.

It is a further aspect of the present invention to provide a photochemically fabricated 3D object having support regions formed from a photocurable resin composition for forming support regions.

A still further aspect of the invention is a method for the production of a photochemically fabricated 3D object. The photochemical 3D fabrication is carried out by means of the inkjet method and comprises the following steps:

forming the main body using a photocurable resin composition, forming support regions using a photocurable resin composition, preferably a photocurable resin composition as mentioned above, and removing the support regions in the fabricated 3D object by dissolving in water and/or by directing a water jet there at.

Here, reference to the "main body" in the specification refers to the "fabricated 3D object" (the photo-chemically fabricated 3D body which is the final target) obtained following elimination of the support regions.

DETAILED DESCRIPTION OF THE INVENTION

The inventive photocurable resin composition for the support regions is a photocurable resin composition for use in forming the support regions in the production of a photochemically fabricated 3D object by the inkjet method. It contains N-hydroxyalkyl (meth)acrylamide (I) represented by the following general formula (I) as component (A);

(where $R^1$ represents a hydrogen atom or a methyl group, and $R^2$ represents a $C_{2-4}$ straight-chain or branched alkylene group).

The N-hydroxyalkyl (meth)acrylamide (I) has especially outstanding photocurability and, as well as providing the inventive photocurable resin composition for the support regions with excellent photocuring performance. It also provides the support regions which are formed by the photocuring of the inventive photocurable resin composition for the support regions with good supporting performance and water solubility.

In the above general formula (I), $R^1$ is a hydrogen atom or a methyl group, and $R^2$ is an ethylene group, n-propylene group, isopropylene group, n-butylene group, isobutylene group or tert-butylene group.

Specific examples of this N-hydroxyalkyl (meth)acrylamide (I) are N-hydroxyethyl (meth)-acrylamide [N-(2-hydroxyethyl) (meth)acrylamide], N-(3-hydroxypropyl) (meth)acrylamide, N-(2-hydroxypropyl) (meth)acrylamide, N-(1-methyl-2-hydroxyethyl) (meth)acrylamide, N-(4-hydroxybutyl) (meth)acrylamide, N-(3-hydroxybutyl) (meth)acrylamide, N-(2-hydroxybutyl) (meth)acrylamide, N-(1,1-dimethyl-2-hydroxyethyl) (meth)acrylamide, N-(1-methyl-3-hydroxypropyl) (meth)acrylamide and the like, and one, two or more of these can be included.

From among these, in terms of ready availability, photocurability, good water solubility of the support regions following photocuring, and ready removal thereof with water jet, N-hydroxyethyl (meth)acrylamide or N-(1,1-dimethyl-2-hydroxyethyl) (meth)acrylamide, and in particular N-hydroxyethyl acrylamide (HEAA) or N-(1,1-dimethyl-2-hydroxyethyl) acrylamide are preferably employed as component (A).

As component (B), the inventive photocurable resin composition for the support regions includes (meth)acryloyl morpholine (II), which is represented by the following general formula (II);

(where $R^3$ represents a hydrogen atom or a methyl group).

The (meth)acryloyl morpholine (II) contributes to enhanced photocuring performance and water solubility.

The inventive photocurable resin composition for the support regions may only include either acryloyl morpholine or methacryloyl morpholine as component (B), or it may contain both.

Of these, in terms of ready availability and low skin irritation, the inclusion of acryloyl morpholine is preferred as component (B).

The inventive photocurable resin composition for the support regions needs to include both N-hydroxyalkyl (meth)acrylamide (I) and (meth)acryloyl morpholine (II), and by including both a synergistic effect is exhibited and a good overall balance is obtained in terms of the photocuring performance of the photocurable resin composition, the supporting performance of the support regions produced by photocuring, the water solubility and the water jet removal.

If only the N-hydroxyalkyl (meth)acrylamide (I) or the (meth)acryloyl morpholine (II) is included, the photocurability of the photocurable resin composition for the support regions is inferior, or the supporting performance of the support regions formed by photocuring is reduced or the water solubility of the support regions is inferior, and so it is not possible to attain the objectives of the present invention.

The inventive photocurable resin composition for the support regions contains from 2 to 20 mass % of N-hydroxyalkyl (meth)acrylamide (I) and from 2 to 20 mass % of (meth)acryloyl morpholine (II), as proportions based on the total mass of said cured resin layer.

Preferably, the inventive photocurable resin composition for the support regions contains from 3 to 15 mass %, and in particular from 5 to 10 mass %, of N-hydroxyalkyl (meth)acrylamide (I), and from 3 to 15 mass %, and in particular 5 to 10 mass %, of (meth)acryloyl morpholine (II).

Furthermore, in the inventive photocurable resin composition for the support regions, the combined content of the N-hydroxyalkyl (meth)acrylamide (I) and the (meth)acryloyl morpholine (II) is preferably from 5 to 40 mass %, more preferably from 6 to 30 mass %, and still more preferably from 10 to 20 mass %, based on the total mass of said photocurable resin composition.

When the combined content of the N-hydroxyalkyl (meth) acrylamide (I) and the (meth)acryloyl morpholine (II) lies within the aforesaid range, not only is the photocurability of the photocurable resin composition for the support regions good but also the supporting performance of the support regions formed by photocuring, the water solubility thereof and their removal by means of a small external force are all excellent.

The inventive photocurable resin composition for the support regions contains a (meth)acrylate compound having at least one (meth)acryloyloxy group as component (C) [hereinafter this is sometimes referred to as (meth)acrylate compound (C)].

Examples of (meth)acrylate compound (C) are monofunctional (meth)acrylate compounds having one (meth)acryloyloxy group and polyfunctional (meth)acrylate compounds having two or more (meth)acryloyloxy groups, and the inventive photocurable resin composition used for the support regions may include only monofunctional (meth)acrylate compound or only polyfunctional (meth)acrylate compound as said (meth)acrylate compound (C), or it may include both monofunctional (meth)acrylate and polyfunctional (meth)acrylate compounds.

As specific examples of the monofunctional (meth)acrylate compounds, monofunctional (meth)acrylate compounds of high polarity are preferred, with preferred examples of these being hydroxyethyl (meth)acrylate, hydroxypropyl (meth)acrylate and other such mono(meth)acrylates of aliphatic diols, polyethylene glycol mono(meth)acrylate, polypropylene glycol mono(meth)acrylate, polytetramethylene glycol mono(meth)acrylate, polyethylene glycol/polypropylene glycol copolymer mono(meth)acrylate and other such mono(meth)acrylates of aliphatic polyalkylene glycols, and mono(meth)acrylates of polyester diols, in particular aliphatic diols, and one, two or more of these can be used.

As specific examples of the polyfunctional (meth)acrylate compounds, polyfunctional (meth)acrylate compounds having an aliphatic polyether structure or an aliphatic polyester structure are preferred, with preferred specific examples of these being the di(meth)acrylates of aliphatic polyalkylene glycols such as polyethylene glycol di(meth)acrylate, polypropylene glycol di(meth)acrylate, polytetramethylene glycol di(meth)acrylate and polyethylene glycol/polypropylene glycol copolymer di(meth)acrylate, the di(meth)acrylates of aliphatic polyester diols, and the di(meth)acrylates of urethanes with an aliphatic polyether structure or an aliphatic polyester structure, and one, two or more of these can be used.

In the case where the monofunctional (meth)acrylate or the polyfunctional (meth)acrylate has an aliphatic polyether structural region or an aliphatic polyester structural region in the molecule, the molecular weight of said aliphatic polyether structural region or aliphatic polyester structural region is preferably from 600 to 2000, and preferably from 800 to 1500.

When a monofunctional (meth)acrylate compound is used as (meth)acrylate compound (C), support regions with good water solubility are formed, and when a polyfunctional (meth)acrylate compound is used support regions of outstanding supporting performance are formed.

Hence, by selecting the types and combination of (meth)acrylate compounds (C), it is possible to adjust the balance between photocurability and the performance of the support regions formed by photocuring.

Of these, in the present invention it is preferred from the point of view of supporting performance, photocurability, water solubility and removability by a water jet that a (meth)acrylate compound having two (meth)acryloyloxy groups be included as (meth)acrylate compound (C).

In the inventive photocurable resin composition for the support regions there is included from 3 to 30 mass %, preferably from 4 to 20 mass %, and more preferably from 5 to 10 mass % of the (meth)acrylate compound (C), as a proportion based on the total mass of said photocurable resin composition.

By including this amount of (meth)acrylate compound (C), it is possible to provide the support regions formed by photocuring with ready water solubility, while still maintaining good photocuring performance in the photocurable resin composition used for the support regions.

The inventive photocurable resin composition for the support regions also contains a polyhydroxy compound having two or more hydroxyl groups as component (D) [below this is sometimes referred to as polyhydroxy compound (D)].

For obtaining support regions having good water solubility there is preferably used, as polyhydroxy compound (D), a water soluble polyhydroxy compound which does not possess any curable functional groups like ethylenically-unsaturated groups.

Preferred specific examples of polyhydroxy compound (D) are water soluble alkylene glycols such as ethylene glycol, propylene glycol and butanediol, polyhydric alcohols with three or more hydroxyl groups such as glycerol and diglycerol, and polyalkylene glycols [poly(oxyalkylene) glycols] such as polyethylene glycol [poly(oxyethylene) glycol], polypropylene glycol [poly(oxypropylene) glycol] and polyethylene glycol/polypropylene glycol copolymer, and one, two or more of these can be included.

From the point of view of making the viscosity of the photocurable resin composition for the support regions a low viscosity suitable for jet spraying, making the support regions formed by photocuring readily water soluble, and making it possible to achieve ready separation from the main body with a small external force such as a water jet, the molecular weight of polyhydroxy compound (D) is preferably no more than 2000, more preferably between 50 and 1000, and still more preferably between 60 and 500.

The amount of polyhydroxy compound (D) included in the inventive photocurable resin composition for the support regions is from 40 to 90 mass %, preferably from to 85 mass %, and more preferably from 60 to 80 mass %, as a proportion based on the total mass of said photocurable resin composition.

It is preferred that the types, combination and content of the polyhydroxy compounds (D) used be adjusted to both enhance the water solubility of the support regions and facilitate separation thereof from the main body with a small external force such as a water jet, and also to provide the support regions with suitable flexibility, mechanical strength and supporting performance.

It is preferred that the inventive photocurable resin composition for the support regions contains from 2 to 10 mass %, and in particular from 3 to 7 mass %, of diglycerol as part of polyhydroxy compound (D), based on the total mass of photocurable resin composition used for the support regions.

Furthermore, it is preferred that the inventive photocurable resin composition for the support regions contains, in proportions based on the total mass of polyhydroxy compound (D), from 25 to 75 mass %, and in particular from 30 to 70 mass %, of an alkylene glycol such as ethylene glycol or propylene glycol, from 15 to 50 mass %, and in particular from 20 to 45 mass %, of a polyhydric alcohol having three or more hydroxyl groups such as glycerol or diglycerol, and from 5 to 35 mass %, and in particular from 10 to 30 mass %, of a poly(alkylene glycol) such as polyethylene glycol, polypropylene glycol or polyethylene glycol/polypropylene glycol copolymer.

The photo-radical polymerization initiator included as component (E) in the inventive photocurable resin composition for the support regions may be any compound which initiates a radical polymerization reaction by means of light such as ultraviolet, near ultraviolet, visible light, infrared or far infrared radiation, of the kind used in the curing of the photocuring resin compositions in photochemical fabrication by the inkjet method, and it is not particularly restricted, so conventional general-purpose photo-radical polymerization initiators can be employed.

While there is no restriction thereto, specific examples of photo-radical polymerization initiators which can be used as component (E) include 1-hydroxycyclohexyl phenyl ketone, 2,2-dimethoxy-2-phenylacetophenone, xanthone, fluorenone, fluorene, anthraquinone, 3-methylacetophenone, 4-chlorobenzophenone, 4,4'-dimethoxybenzophenone, 4,4'-diaminobenzophenone, benzoin propyl ether, benzoin ethyl ether, benzyl dimethyl ketal, 1-(4-isopropylphenyl)-2-hydroxy-2-methylpropan-1-one, 2-hydroxy-2-methyl-1-phenylpropan-1-one, 2-methyl-1-[4-(methylthio)phenyl]-2-morpholino-propan-1-one, 2,4,6-trimethylbenzoyldiphenylphosphine oxide, bis-(2,6-dimethoxybenzoyl)-2,4,4-trimethylpentylphosphine oxide, bis(2,4,6-trimethylbenzoyl)phenylphosphine oxide, 1-[4-(2-hydroxyethoxy)-phenyl]-2-hydroxy-2-methyl-1-propan-1-one and the like, with examples of actual commercial products being "Irgacure 184", "Irgacure 369", "Irgacure 651", "Irgacure 500", "Irgacure 819", "Irgacure 907", "CGI 1700", "CGI 1750", "CGI 1850", "CG24-61", "Darocur 1116", "Darocur 1173", "Lucirin TPO", "Irgacure 2959" and the like, and it is possible to include one, two or more of these photo-radical polymerization initiators as component (E) in the inventive photocurable resin composition for the support regions.

The inventive photocurable resin composition for the support regions contains from 0.1 to 5 mass %, preferably from 0.2 to 4 mass %, and more preferably from 0.4 to 3 mass % of component (E) (the photo-radical polymerization initiator), as a proportion based on the total mass of said photocurable resin composition.

Along with this component (E) (the photo-radical polymerization initiator), the inventive photocurable resin composition for the support regions optionally also contains a photopolymerization initiation adjuvant such as an aliphatic amine or aromatic amine. Specific examples of these include aliphatic amine compounds such as triethanolamine, methyl diethanolamine, triisopropanolamine, n-butylamine, N-methyl-ethanolamine, diethylaminoethyl methacrylate, diethylaminoethyl acrylate, dimethylaminoethyl methacrylate and dimethylaminoethyl acrylate, and aromatic amine compounds such as Michler's ketone, 4,4'-diethylaminophen, ethyl dimethylaminobenzoate, isoamyl dimethylaminobenzoate and ethyl diethylaminobenzoate, and one, two or more of these can be included.

Moreover, the inventive photocurable resin composition for the support regions can optionally include (meth)acrylamide other than the N-hydroxyalkyl (meth)acrylamide (I) and (meth)acryloyl morpholine (II). Specific examples of these other (meth)acrylamides are N-alkyl (meth)acrylamides having a $C_{1-4}$ alkyl group such as N-methyl (meth) acrylamide, N-ethyl (meth)acrylamide, N-propyl (meth) acrylamide, N-butyl (meth)acrylamide, N,N'-dimethyl (meth)acrylamide and N,N'-diethyl (meth)acrylamide.

In the case where the inventive photocurable resin composition for the support regions contains other (meth)acrylamide, the amount thereof is preferably no more than 20 mass %, and in particular no more than 15 mass %, based on the total mass of said photocurable resin composition.

When other (meth)acrylamide is also included, an effect in improving the photocuring property may be obtained.

As well as the aforedescribed components, the inventive photocurable resin composition for the support regions can optionally include one, two or more various additives such as antioxidants, ultraviolet absorbers, photostabilizers, radical polymerization inhibitors, levelling agents, surfactants, storage stabilizers, plasticizers, ageing preventives, wetting enhancers and colouring agents, etc.

While in no way being restricted thereto, examples of the antioxidants include "Irganox 1010", "Irganox 1035", "Irganox 1076" and "Irganox 1222" produced by BASF, "Sumilizer GA-80" and "Sumilizer GA-GP" produced by the Sumitomo Chemical Co.,; examples of the ultraviolet absorbers include "Tinuvin P", "Tinuvin 234", "Tinuvin 320", "Tinuvin 326", "Tinuvin 327", "Tinuvin 328", "Tinuvin 329" and "Tinuvin 213" produced by BASF, and "Seesorb 102", "Seesorb 103", "Seesorb 501", "Seesorb 202", "Seesorb 712" and "Seesorb 704", produced by Shipro Kasei Kaisha Ltd; and examples of the photostabilizers are "Tinuvin 292", "Tinuvin 144" and "Tinuvin 622LD" produced by BASF, "Sanol LS-770" produced by the Sankyo Corp. and "TM-061" produced by the Sumitomo Chemical Co.

It is preferred that the inventive photocurable resin composition for the support regions contains radical polymerization inhibitor, and by including radical polymerization inhibitor it is possible to prevent polymerization when performing heating to lower the viscosity of said photocurable resin composition for the support regions, and it is possible thereby to secure a sufficiently low viscosity for discharging the photocurable resin composition used for the support regions smoothly from jet nozzles.

While not restricted thereto, specific examples of the radical polymerization inhibitors are 4-methoxyphenol (otherwise known as mequinol), 2,6-di-tert-butyl-p-cresol and phenothiazine, and one, two or more of these may be used.

The radical polymerization inhibitor content will differ according to the type of radical polymerization inhibitor, the composition and photocuring properties of the photocurable resin composition for the support regions, the type and form of inkjet photochemical fabrication equipment, and the temperature of the photocurable resin composition for the support regions when carrying out photochemical fabrication. It is preferred that there be added an amount such that polymerization is not initiated even when the photocurable resin composition for the support regions is held for a comparatively long time at temperatures of about 60-80° C. It is possible to prevent polymerization of the photocurable resin composition used for the support regions and to maintain a low viscosity at the time of storage of the photocurable resin composition used for the support regions and at the time of discharge thereof from the jet nozzles, when, in terms of the photocurable resin composition used for the support regions, there is included about 500-2000 ppm of the radical polymerization inhibitor in the case where 4-methoxy phenol is employed, and similarly about 200-500 ppm where phenothiazine is employed, or about 500-2000 ppm where 2,6-di-tert-butyl-p-cresol is employed.

The inventive photocurable resin composition for the support regions may also optionally contain particulate materials such as inorganic fillers or organic fillers. Since jet nozzles are readily clogged when particulate materials are present, it is necessary when such particulate materials are included to use materials of primary particle diameter sufficiently smaller than the internal diameter of the nozzles and, furthermore, materials which do not form secondary particles by aggregation when incorporated into the photocurable resin composition for the support regions.

In the case where fillers or other particulate materials are included, it is preferred that the amount be no more than 10 mass % based on the total mass of the photocurable resin composition for the support regions.

From the point of view of the dischargeability from inkjet nozzles and the shape retention of the discharged liquid droplets, etc., it is preferred that the viscosity of the inventive photocurable resin composition for the support regions be between 40 and 200 mPa·s, and preferably between 50 and 100 mPa·s, when measured at 25° C.

The inventive photocurable resin composition for the support regions will be capable of being cured by light such as near-ultraviolet, ultraviolet, visible light, infrared or far-infrared radiation. the type of light should be in accordance with the type of light used for photocuring adopted in the photochemical fabrication technique based on the inkjet method in which said resin composition is used. Generally speaking, resin compositions cured with ultraviolet and/or near-ultraviolet radiation are widely used as the photocuring resin compositions for forming the main body. Therefore, it is preferred that the inventive photocurable resin composition for the support regions is also cured by ultraviolet and/or near-ultraviolet radiation.

It is preferred that the cured product formed by photocuring the inventive photocurable resin composition for the support regions has sufficient supporting capacity in the photochemical fabrication and immediately after the fabrication, and that following the end of the photochemical fabrication it is of a strength such that it may be readily separated and removed from the main body by a weak force such as that of a water jet, for example a breaking strength of about 0.01 to 5 MPa.

There are no particular restrictions on the method for producing the photochemically fabricated 3D object by the inkjet method employing the inventive photocurable resin composition used for the support regions, and it is possible to employ conventionally-known photochemical 3D fabrication methods based on the inkjet method.

While there is no restriction thereto, it is possible, for example, to adopt a method in which a photocurable resin composition for forming the main body (hereinafter referred to as the "photocurable resin composition for the main body") plus the inventive photocurable resin composition for the support regions are both employed, and either this photocurable resin composition for the main body or the inventive photocurable resin composition for the support regions, or both, is/are discharged in fine liquid droplet form from inkjet nozzles. The amount and configuration is controlled based on data input in three-dimensional CAD to form a single drawn layer of specified shaped pattern on a flat base plate such as a build tray. Then, the single drawn layer is subjected to light irradiation and cured. In the next step either the photocurable resin composition for the main body or the inventive photocurable resin composition for the support regions, or both, is/are discharged in fine liquid droplet form from inkjet nozzles in a controlled amount and configuration onto this cured drawn layer to form a further single drawn layer of specified shaped pattern. Light exposure follows, said drawn layer cures, and upon repetition of this layering operation a fabricated 3D object is produced.

By producing a fabricated 3D object employing the inventive photocurable resin composition for the support regions, there are no particular restrictions on the shape or structure of the support regions. The shape or structure of the support regions on the other hand may be designed in accordance with the shape, structure, size and material of the main body such that during photochemical fabrication or following fabrication no distortion, strain or collapse of the main body arises.

For example, in the case where the main body is of a shape having an overhang region, it is necessary to decide on a support region shape, structure and positional arrangement such that, during the photochemical fabrication or immediately following fabrication (for example, prior to complete curing), there is no sagging, distortion or damage to the overhang region due to the own weight of said overhang region, or distortion or damage, to the main body part along with distortion to the overhang portion.

Moreover, where required, regions not requiring support may also be covered with the inventive photocurable resin composition for the support regions and, in turn, with the cured product thereof, in order to prevent degeneration of the main body due to excessive light irradiation.

In carrying out photochemical fabrication using the inkjet method, any of the photocurable resin compositions (the photocurable resin compositions for forming the fabricated 3D object which constitutes the main body) conventionally employed in photochemical fabrication technology based on the inkjet method may be employed as the photocurable resin composition for the main body which is used along with the inventive photocurable resin composition for the support regions.

Of these, it is preferred that a photocurable resin composition is used which is readily cured by light of the same wavelength as the inventive photocurable resin composition for the support regions. Hence, it is possible to cure both the main body and the support regions smoothly using light of the same wavelength (the same light source).

The inventive photocurable resin composition for the support regions may be of the same colour as the photocurable resin composition for the main body, or it may be a different colour. In the case where the colour of the inventive photocurable resin composition for the support regions is made of a different colour from that of the photocurable resin composition for the main body, it is possible to clearly distinguish which region is the main body and which region is a support in the fabricated 3D object obtained by the photochemical fabrication. When the treatment to remove the support regions has been carried out it is again possible to confirm readily by, for example, visual inspection, whether or not the support regions have been completely removed from the main body.

In the photochemical fabrication, the photocurable resin composition for the main body and the photocurable resin composition for the support regions may be discharged from the same inkjet nozzles. It is preferred that photochemical fabrication be carried out while discharging the photocurable resin composition for the main body and the photocurable resin composition for the support regions from separate inkjet nozzles. By performing photochemical fabrication while discharging the photocurable resin composition for the main body and the photocurable resin composition for the support regions from separate inkjet nozzles, it is possible to form a fabricated 3D object with attached support regions wherein the main body region and the support regions are clearly divided. After dissolving out the support regions in water or removing them by means of a weak force such as with a water jet, it is possible to obtain the main body (the final target fabricated 3D object) with a good finish.

Examples of the light used when carrying out photochemical fabrication include ultraviolet, near-ultraviolet, visible, infrared and far-infrared radiation. It is necessary to employ light of wavelength suitable for the curing of the photocurable resin composition for the main body and also the photocurable resin composition for the support regions. Generally speaking, the photocurable resin composition for the main body and the photocurable resin composition for the support regions are designed so as to be cured by light in the ultraviolet and/or near-ultraviolet region, so ultraviolet and/or near-ultraviolet radiation are preferably employed. The light source is preferably a UV lamp, a UV-LED lamp, a high pressure mercury lamp or a metal halide lamp.

Examples of the methods employed for removing the support regions from the fabricated 3D object obtained by performing photochemical fabrication using the photocurable resin composition for the main body and the photocurable resin composition for the support regions include the method of removal from the main body by applying an external force such as that of a water jet to the support regions, the method of removal by dissolving in water by exposure to water, for example, immersing the entire fabricated 3D object or the support regions of the fabricated 3D object in water, or the method in which the entire fabricated 3D object or the support regions in the fabricated 3D object is/are exposed to water for a short time (by immersion or the like) and caused to swell, after which the support regions are removed by applying an external force such as a water jet.

EXPLANATION OF THE CODES

α test piece (fabricated 3D object with attached support regions)
1 main body
2 support region

WORKING EXAMPLES

Below, the present invention is explained in more specific terms by means of working examples, but this invention is not to be restricted in any way to these examples.

In the examples below, the measurement of the viscosity of the photocurable resin composition used for the support regions, the evaluation of the photocurability of the photocurable resin composition used for the support regions, and the evaluations of the supporting performance of the support regions in the fabricated 3D object formed by photochemical fabrication, the removal thereof by means of a water jet and the water solubility thereof, were respectively carried out in the following manner.

(1) Viscosity of the photocurable resin composition used for the support regions.

The viscosity of the photocurable resin composition used for the support regions was measured at a temperature of 25° C. with a B-type viscometer (model BII) manufactured by the Toki Sangyo Co.

(2) Evaluation of the photocurability of the photocurable resin composition used for the support regions:

(i) Employing "VeroWhite Polyjet (FC-830)" produced by Stratasys Ltd as the photocurable resin composition for the main body, and using respectively each of the photocurable resin compositions for the support regions from Working Examples 1-8 and Comparative Examples 1-4 below as the photocurable resin composition for the support regions, test-piece α (a fabricated 3D object with attached support regions) shown in FIG. 1 was created using an inkjet type photochemical fabricator model "Eden 260V" manufactured by Stratasys Ltd.

Figure 1:
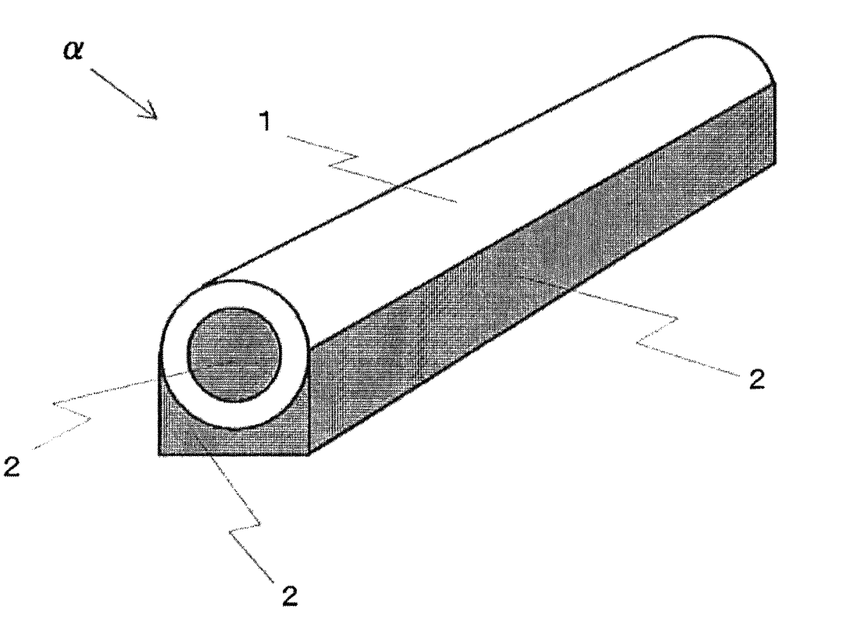
FIG. 1 is a drawing showing, schematically, a test piece (a fabricated 3D object with attached support regions) created in the working and comparative examples.

In FIG. 1, 1 denotes the main body (a cylindrical body of outer diameter 16 mm, inner diameter 10 mm and length 100 mm), and the hatched regions 2 denote the support regions.

In the creation of the test-piece, photochemical fabrication was carried out in such a way that the cylindrical body which constituted main body 1 was formed lengthwise as shown in FIG. 1 and, furthermore, support regions were formed within the cylindrical body constituting main body 1, beneath the cylindrical body and to a height of half the cylindrical body exterior.

The thickness of the support region positioned beneath the cylindrical body (the dimension of the region of smallest thickness) was 3 mm.

(ii) The photocurability of the photocurable resin composition used for the support regions at the time of the creation of the test piece in FIG. 1 was evaluated based on the following evaluation criteria.

[Evaluation Criteria for the Photocurability of the Photocurable Resin Composition Used for the Support Regions]

◎: Photocurability extremely good; model retention and shape retention good

○: Photocurability good; possesses model retention and shape retention

Δ: Photocurability somewhat poor; model retention and shape retention somewhat difficult x: Photocurability poor; problems with model retention and shape retention (3) Evaluation of the supporting performance of the support regions:

Creation of the test piece α shown in FIG. 1 was carried out five times, and then evaluation of the support regions performed based on the following evaluation criteria.

[Evaluation Criteria for the Supporting Performance of the Support Regions]

◎: All five times, no distortion, discoloration, etc., of main body 1 (the cylindrical body) occurred, and it was possible to create main body 1 (the cylindrical body) with the dimensions expected.

○: In four out of five cases, no distortion, discoloration, etc., of main body 1 (the cylindrical body) occurred, and it was possible to create main body 1 (the cylindrical body) with the dimensions expected.

Δ: In two out of five cases, distortion, discoloration, etc., of main body 1 (the cylindrical body) occurred.

x: In three or more cases out of five, distortion, discoloration, etc., of main body 1 (the cylindrical body) occurred.

(4) Evaluation of the removal of a support region with a water jet:

Using a water jet washer for removing support regions (a "Water Jet" manufactured by Stratasys Ltd), elimination of the support region formed inside main body 1 (the cylindrical body) in test piece α shown in FIG. 1, which was created in (2)(i) above, was performed and evaluation carried out based on the evaluation criteria below.

In performing the removal treatment of the support region inside the cylindrical body by means of the water jet, the strength of the water jet was kept to a standard value, the centre of the water jet was aligned with the centre of the interior of the cylindrical body, and the distance between the tip of the jetting nozzle in the water jet washer and the cylindrical body opening was made 15 cm.

[Evaluation Criteria for the Elimination of the Support Region with a Water Jet]

⊚: The support region within the cylindrical body could be completely eliminated within 1 minute from the start of washing.

○: The support region within the cylindrical body could be completely eliminated in a time between 1 minute and 2 minutes from the start of washing.

Δ: The time required to completely eliminate the support region within the cylindrical body was more than 2 minutes but less than 3 minutes.

x: Even after 3 minutes from the start of washing, support region remained within the cylindrical body.

(5) Evaluation of the water solubility of the support regions: The test piece α shown in FIG. 1, which was created in (2)(i) above, was completely immersed in 2000 mL of water at a temperature of 25° C. and, while stirring with a stirrer, dissolution of the support regions was performed, with evaluation of the water solubility of the support being carried out based on the following evaluation criteria.

[Evaluation Criteria for the Water Solubility of the Support Regions]

⊚: All the support regions (the support regions outside and inside the cylindrical body) dissolved within 30 minutes following immersion in water.

○: All the support regions (the support regions outside and inside the cylindrical body) dissolved in a time of between 30 minutes and 60 minutes following immersion in water.

Δ: All the support regions (the support regions outside and inside the cylindrical body) dissolved in a time exceeding 60 minutes but within 240 minutes following immersion in water.

x: Even after 240 minutes following immersion in the water, some of the support regions (in particular, the support region within the cylindrical body) did not dissolve, and remained affixed to the main body.

Working Example 1

(1) A photocurable resin composition for the support regions (the resin composition viscosity measured at 25° C.=64 mPa·s) was prepared by mixing together at room temperature: 6 parts by mass of N-hydroxyacrylamide (produced by the KJ Chemicals Corp.), 9 parts by mass of acryloyl morpholine (produced by the KJ Chemicals Corp.), 5 parts by mass of polyethylene glycol diacrylate (molecular weight of the polyethylene glycol region=600) ("NK-A-600" produced by the Shin-Nakamura Chemical Co.), 50 parts by mass of propylene glycol, 15 parts by mass of glycerol, 3 parts by mass of diglycerol, 12 parts by mass of polypropylene glycol (molecular weight 400) ("Polypropylene Glycol 400", produced by Univar Inc.), 0.5 parts by mass of 1-[4-(2-hydroxyethoxy)-phenyl]-2-hydroxy-2-methyl-1-propan-1-one ("Irgacure 2959" produced by BASF) and 300 ppm of phenothiazine (polymerization inhibitor).

(2) The test piece α shown in FIG. 1 (a fabricated 3D object with attached support regions) was created using the photocurable resin composition for the support regions obtained in (1) above, together with a photocurable resin composition for the main body comprising "VeroWhite Polyjet (FC-830)" produced by Stratasys Ltd, and employing the inkjet photochemical fabricator "Eden 260V" produced by Stratasys Ltd (where, as the light source, there was used a MHL250 bulb produced by Ushio Inc.; a standard item for the device) under standard fabrication conditions for the Eden 260V.

(3) When the photocuring performance of the photocurable resin composition used for the support regions at the time of the creation of test piece α in (2) above was evaluated by the method described above and, furthermore, when the supporting performance of the support regions in the test piece α obtained in (2) above, along with the removal by jet washing and the water solubility thereof were respectively evaluated in the manner described earlier, the results were as shown in Table 1 below.

Working Examples 2 to 4

(1) The photocurable resin composition for the support regions was prepared in the same way as in (1) of Working Example 1 using, respectively, the components shown in Table 1 below. The viscosity of the photocurable resin composition obtained in each case in this way was as shown in Table 1 below.

(2) Test piece α shown in FIG. 1 (a fabricated 3D object with attached support regions) was created in the same way as in (2) of Working Example 1 except that the photocurable resin composition for the support regions obtained in (1) above was employed, and when the photocuring performance of the photocurable resin composition used for the support regions at the time of the creation of test piece α was evaluated by the method described above and, furthermore, when the supporting performance of the support regions in the test piece α obtained, along with the removal by jet washing and the water solubility thereof were respectively evaluated in the manner described above, the results were as shown in Table 1 below.

Working Examples 5 to 8

(1) The photocurable resin composition for the support regions was prepared in the same way as in (1) of Working Example 1 using, respectively, the components shown in the following Table 2. The viscosity of the photocurable resin composition obtained in each case in this way was as shown in Table 2 below.

(2) Test piece α shown in FIG. 1 (a fabricated 3D object with attached support regions) was created in the same way as in (2) of Working Example 1 except that the photocurable resin composition for the support regions obtained in (1) above was employed, and when the photocuring performance of the photocurable resin composition used for the support regions at the time of the creation of test piece α was evaluated by the method described above and, furthermore, when the supporting performance of the support regions in the test piece α obtained, along with the removal by jet washing and the water solubility thereof were respectively evaluated in the manner described above, the results were as shown in Table 2 below.

Comparative Examples 1 to 4

(1) The photocurable resin composition for the support regions was prepared in the same way as in (1) of Working Example 1 using, respectively, the components shown in the following Table 3. The viscosity of the photocurable resin composition obtained in each case in this way was as shown in Table 3 below.

(2) Test piece α shown in FIG. 1 (a cylindrical body with attached support regions) was created in the same way as in (2) of Working Example 1 except that the photocurable resin composition for the support regions obtained in (1) above was employed, and when the photocuring performance of the photocurable resin composition used for the support regions at the time of the creation of test piece α was evaluated by the method described above and, furthermore, when the supporting performance of the support regions in the test piece α obtained, along with the removal by jet washing and the water solubility thereof were respectively evaluated in the manner described above, the results were as shown in Table 3 below.

TABLE 1

| | Working Example 1 | Working Example 2 | Working Example 3 | Working Example 4 |
|---|---|---|---|---|
| [Photocurable resin composition used for the support regions] (A) component | | | | |
| N-hydroxyethyl acrylamide (B) component | 6 | 6 | 5 | 10 |
| acryloyl morpholine (C) component | 9 | 9 | 5 | 10 |
| polyethylene glycol (MWt 600) diacrylate[1] | 5 | | | |
| polyethylene glycol (MWt 1000) diacrylate[2] (D) component | | 5 | 5 | 5 |
| propylene glycol | 50 | 50 | 40 | 30 |
| Glycerol | 15 | 15 | 30 | 24 |
| Diglycerol | 3 | 3 | 5 | 6 |
| polypropylene glycol (MWt 400)[3] (E) component | 12 | 12 | 10 | 20 |
| Irgacure 2959 (photo-radical initiator)[4] | 0.5 | 0.5 | 0.5 | 0.5 |
| Lucirin TPO (photo-radical initiator)[5] | | | | |
| Polymerization Inhibitor | | | | |
| 4-methoxyphenol (polymerization inhibitor) | | 1000 ppm | 1000 ppm | |
| phenothiazine (polymerization inhibitor) | 300 ppm | | | 300 ppm |
| [Photocurable resin composition used for the support regions] | | | | |
| Viscosity (mPa·s) (25° C.) | 64 | 64 | 66 | 61 |
| Photocurability | ◎ | ◎ | ◎ | ◎ |
| [Performance of the Support Regions] | | | | |
| Supporting performance | ◎ | ◎ | ◎ | ◎ |
| Water jet elimination | ◎ | ◎ | ◎ | ◎ |
| Water solubility | ◎ | ◎ | ◎ | ○ |

[1] "NK-A-600" produced by the Shin-Nakamura Chemical Co.
[2] "NK-A-1000" produced by the Shin-Nakamura Chemical Co.
[3] "Polypropylene Glycol 400" produced by Univar Inc.
[4] 1-[4-(2-hydroxyethoxy)-phenyl]-2-hydroxy-2-methyl-1-propan-1-one (produced by BASF)
[5] 2,4,6-trimethylbenzoyl diphenylphosphine oxide (produced by BASF)

TABLE 2

| | Working Example 5 | Working Example 6 | Working Example 7 | Working Example 8 |
|---|---|---|---|---|
| [Photocurable resin composition used for the support regions] (A) component | | | | |
| N-hydroxyethyl acrylamide (B) component | 10 | 3 | 5 | 10 |
| acryloyl morpholine (C) component | 10 | 3 | 10 | 5 |
| polyethylene glycol (MWt 600) diacrylate[1] | 5 | | | 5 |
| polyethylene glycol (MWt 1000) diacrylate[2] (D) component | | 5 | 5 | |
| propylene glycol | 30 | 45 | 30 | 30 |
| Glycerol | 24 | 25 | 25 | 30 |
| Diglycerol | 6 | 5 | 5 | 5 |
| polypropylene glycol (MWt 400)[3] (E) component | 20 | 14 | 15 | 15 |
| Irgacure 2959 (photo-radical initiator)[4] | 0.5 | 0.5 | 0.5 | 0.5 |
| Lucirin TPO (photo-radical initiator)[5] | | | | |
| Polymerization Inhibitor | | | | |
| 4-methoxyphenol (polymerization inhibitor) | | | 1500 ppm | 1500 ppm |
| phenothiazine (polymerization inhibitor) | 300 ppm | 300 ppm | | |
| [Photocurable resin composition used for the support regions] | | | | |
| Viscosity | 59 | 66 | 62 | 63 |
| Photocurability | ◎ | ◎ | ◎ | ◎ |
| [Performance of the Support Regions] | | | | |
| Supporting performance | ◎ | ○ | ◎ | ◎ |
| Water jet elimination | ◎ | ◎ | ◎ | ◎ |
| Water solubility | ○ | ◎ | ◎ | ◎ |

[1] "NK-A-600" produced by the Shin-Nakamura Chemical Co.
[2] "NK-A-1000" produced by the Shin-Nakamura Chemical Co.
[3] "Polypropylene Glycol 400" produced by Univar Inc.
[4] 1-[4-(2-hydroxyethoxy)-phenyl]-2-hydroxy-2-methyl-1-propan-1-one (produced by BASF)
[5] 2,4,6-trimethylbenzoyl diphenylphosphine oxide (produced by BASF)

TABLE 3

| | Comp. Example 1 | Comp. Example 2 | Comp. Example 3 | Comp. Example 4 |
|---|---|---|---|---|
| [Photocurable resin composition used for the support regions] (A) component | | | | |
| N-hydroxyethyl acrylamide (B) component | | | 15 | |
| acryloyl morpholine (C) component | 15 | | | 15 |
| polyethylene glycol (MWt 600) diacrylate[1] | | 5 | | |

TABLE 3-continued

|  | Comp. Example 1 | Comp. Example 2 | Comp. Example 3 | Comp. Example 4 |
|---|---|---|---|---|
| polyethylene glycol (MWt 1000) diacrylate[2)] (D) component | 5 |  | 70 |  |
| propylene glycol | 32 | 32 | 10 |  |
| Glycerol | 29 | 29 | 15 |  |
| Diglycerol | 4 | 4 | 5 |  |
| polypropylene glycol (MWt 400)[3)] (E) component | 15 | 15 |  | 85 |
| Irgacure 2959 (photo-radical initiator)[4)] | 0.5 | 0.5 |  |  |
| Lucirin TPO (photo-radical initiator)[5)] Polymerization Inhibitor |  |  | 0.5 | 0.5 |
| 4-methoxyphenol (polymerization inhibitor) |  | 1500 ppm |  | 1000 ppm |
| phenothiazine (polymerization inhibitor) [Photocurable resin composition used for the support regions] | 300 ppm |  | 300 ppm |  |
| Viscosity | 62 | 63 | 61 | 59 |
| Photocurability [Performance of the Support Regions] | ◉ | ◉ | ◉ | Δ |
| Supporting performance | ◉ | ○ | ◉ | Δ |
| Water jet elimination | ○ | ○ | X | ○ |
| Water solubility | Δ | Δ | X | ○ |

[1)]"NK-A-600" produced by the Shin-Nakamura Chemical Co.
[2)]"NK-A-1000" produced by the Shin-Nakamura Chemical Co.
[3)]"Polypropylene Glycol 400" produced by Univar Inc.
[4)]1-[4-(2-hydroxyethoxy)-phenyl]-2-hydroxy-2-methyl-1-propan-1-one (produced by BASF)
[5)]2,4,6-trimethylbenzoyl diphenylphosphine oxide (produced by BASF)

As can be seen from Tables 1 to 3 above, by including the N-hydroxyalkyl (meth)acrylamide (I) which represents component (A) in an amount within the range from 2 to 20 mass %, the (meth)acryloyl morpholine (II) which represents component (B) in an amount within the range 2 to 20 mass %, the (meth)acrylate compound which represents component (C) in the range from 3 to 30 mass %, the polyhydroxy compound with two or more hydroxy groups which represents component (D) in an amount within the range from 40 to 90 mass %, and the photo-radical polymerization initiator which represents component (E) in an amount within the range from 0.1 to 5 mass %, the photocurable resin compositions used for the support regions in Working Examples 1 to 8 have improved photocurability. In addition the support regions formed by the photocuring of said photocurable resin compositions in Working Examples 1 to 8 show improved supporting performance, while at the same time showing excellent water jet elimination and water solubility, which makes the resin suitable as photocurable resin compositions for the support regions employed in photochemical fabrication by the inkjet method.

In contrast, in the case of the photocurable resin composition used for the support regions in Comparative Example 1, no (A) component N-hydroxyalkyl (meth)-acrylamide (I) is included, the water solubility of the support regions formed by photocuring is inferior. It is not possible to remove the support regions easily from the main body by dissolving in water following photochemical fabrication. In addition the elimination by means of a water jet is also inferior compared to the photocurable resin compositions for the support regions in Working Examples 1 to 8.

Moreover, in the case of the photocurable resin composition for the support regions in Comparative Example 2, no (B) component (meth)acryloyl morpholine (II) is included. The water solubility of the support regions formed by photocuring is inferior. It is not possible to remove the support regions easily from the main body by dissolving in water following photochemical fabrication. In addition and in terms of supporting performance and elimination by water jet, the photocurable resin composition for the support regions is not as outstanding as those in Working Examples 1 to 8.

In the case of the photocurable resin composition for the support regions in Comparative Example 3, no (A) or (B) components are included, instead the amount of component (C) is larger. It is considerably inferior in terms of the water jet elimination and water solubility, and it is not possible to remove the support regions from the main body following photochemical fabrication by means of a water jet and/or by dissolving in water. Hence the support regions have to be removed by a mechanical process such as cutting or machining.

In the case of the photocurable resin composition for the support regions in Comparative Example 4, no (A) component or (C) component are included and instead a large amount of poly(propylene glycol) which is one type of (D) component is included. While it is possible to remove the support regions formed following photocuring by means of a water jet and by dissolving in water, both the photocuring and the supporting performance are inferior, and hence it cannot be used effectively as a photocurable resin composition for support regions.

Effects of the Invention

The inventive photocurable resin composition for forming the support regions (hereinafter referred to as the "photocurable resin composition for the support regions") is of low viscosity and can be smoothly discharged in the form of fine liquid droplets from jet nozzles without producing nozzle clogging. Furthermore, its photocurability is excellent, it can be effectively employed as the photocurable resin composition for the support regions when producing fabricated 3D structures having attached support regions by photochemical 3D fabrication by means of the inkjet method.

The support regions formed by the photocuring of the inventive photocurable resin composition for the support regions have sufficient supporting performance.

By carrying out photochemical fabrication using the inkjet method with a photocurable resin composition for forming the main body along with the inventive photocurable resin composition for the support regions, it is possible to smoothly produce fabricated 3D objects of desired dimensions and shape without distortion, strain or collapse, of the 3D fabricated main body.

The support regions formed by photocuring of the inventive photocurable resin composition for the support regions readily dissolve in water. Following the end of the photochemical fabrication, they can be separated and removed from the main body simply and smoothly merely by exposing the fabricated 3D object with attached support regions to water for a short time. In this way it is possible to smoothly obtain a fabricated 3D object (the main body) of outstanding appearance and dimensional accuracy, In spite of the fact that the support regions formed by the photocuring of the inventive photocurable resin composition for the support regions have an excellent supporting performance, they can be simply separated and removed from the main body with a weak external force such as a water jet or the like.

INDUSTRIAL APPLICATION POTENTIAL

The inventive photocurable resin composition for the support regions is of low viscosity and can be smoothly discharged in the form of fine liquid droplets from jet nozzles without producing nozzle clogging. Furthermore, its photocurability is excellent and the support regions formed by photocuring have sufficient supporting performance. Moreover, following the end of photochemical fabrication, they can be simply and completely removed from the main body by either dissolving in water and/or by applying a weak external force such as a water jet, or the like, so the composition can be used effectively as the photocurable resin composition for the support regions when producing fabricated 3D objects by photochemical fabrication by the inkjet method.

The invention claimed is:
1. A photocurable resin composition for use in forming support regions when producing a photochemically fabricated 3D object by an inkjet method using a photocurable resin composition, wherein the photocurable resin composition, for forming said support regions, comprising, in proportions based on a total mass of the photocurable resin composition for forming said support regions each one of:
  (A) from 2 to 20 mass % of an N-hydroxyalkyl (meth)acrylamide (I) represented by the following general formula (I):

(where $R^1$ represents a hydrogen atom or a methyl group and $R^2$ represents a $C_{2-4}$ straight-chain or branched alkylene group);
  (B) from 2 to 20 mass % of (meth)acryloyl morpholine (II) represented by the following formula (II):

(where $R^3$ represents a hydrogen atom or a methyl group);
  (C) from 3 to 30 mass % of a (meth)acrylate compound containing at least one (meth)acryloyloxy group;
  (D) from 40 to 90 mass % of a polyhydroxy compound having two or more hydroxyl groups; and
  (E) from 0.1 to 5 mass % of a photo-radical polymerization initiator.

2. The photocurable resin composition for forming the support regions according to claim 1, wherein a combined content of said N-hydroxyalkyl (meth)acrylamide (I) and said (meth)acryloyl morpholine (II) is from 5 to 40 mass %, based on the total mass of the photocurable resin composition for forming said support regions.

3. The photocurable resin composition for forming the support regions according to claim 1, wherein said component (C) is a (meth)acrylate compound having a (meth)acryloyloxy group and an aliphatic polyether structure.

4. The photocurable resin composition for forming the support regions according to claim 1, wherein said component (D) is a non-curable polyhydroxy compound of molecular weight no more than 2000.

5. The photocurable resin composition for forming the support regions according to claim 1, wherein the total mass of the photocurable resin composition for forming said support resin comprises as part of said component (D) from 2 to 10 mass % of diglycerol.

* * * * *